Nov. 14, 1933.  A. LYSHOLM  1,934,936
HYDRAULIC TRANSMISSION
Filed Aug. 7, 1931  2 Sheets-Sheet 1
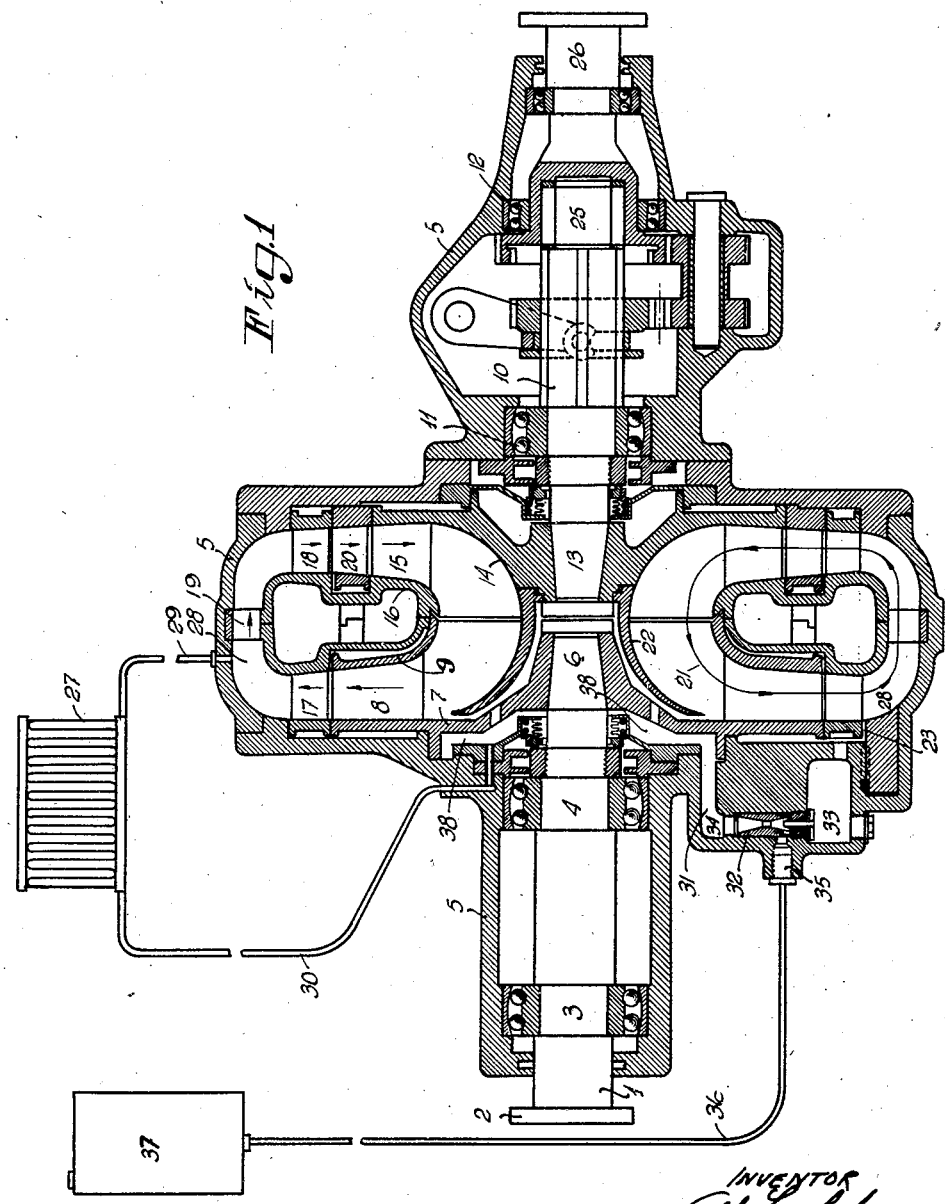

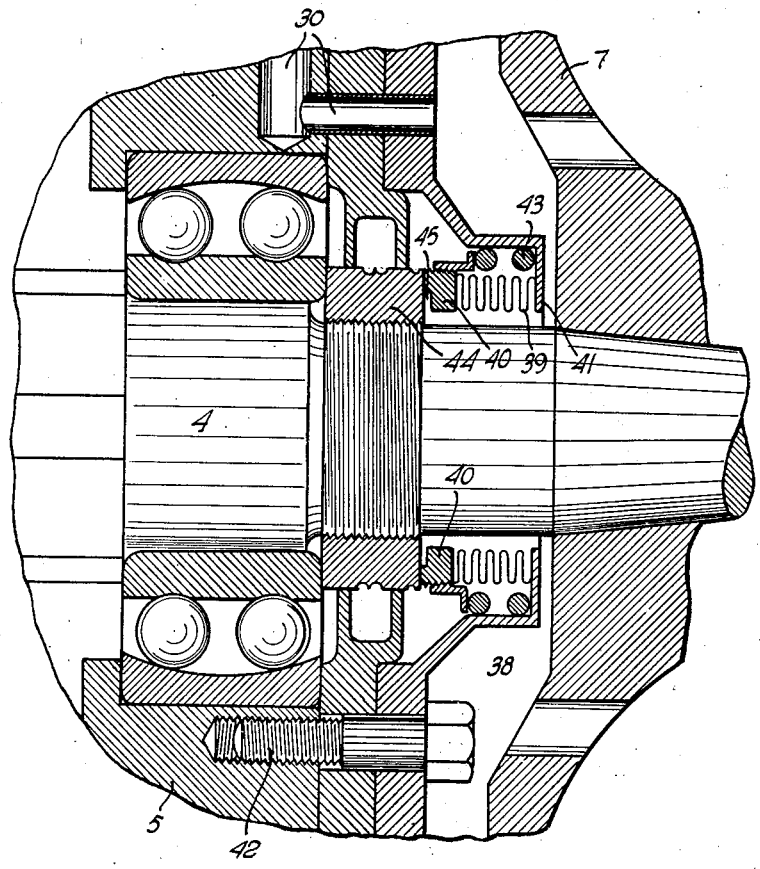

Patented Nov. 14, 1933

1,934,936

UNITED STATES PATENT OFFICE 1,934,936

HYDRAULIC TRANSMISSION

Alf Lysholm, Stockholm, Sweden, assignor to Aktiebolaget Ljungströms Angturbin, Stockholm, Sweden, a joint-stock company of Sweden Application August 7, 1931, Serial No. 555,767, and in Sweden August 9, 1930

15 Claims. (Cl. 60—54)

The present invention relates to hydraulic transmissions and has particular reference to variable speed hydraulic transmissions of the type in which operating fluid is caused to circulate in a closed path of flow so as to transmit power from a driving member to a driven member operating at different speeds relative to the speed of the driving member. Still more particularly, the invention relates to hydraulic transmissions of the above general character in which the driving member comprises a pump impeller or the like for causing circulation of the operating fluid and the driven member comprises a turbine rotor adapted to be driven due to circulation of the operating fluid.

In transmissions of the above character, particularly in transmissions where the velocity of flow of the operating fluid is relatively high, difficulties are encountered due to cavitation of the operating fluid, which is usually liquid, which reduces the efficiency of the transmission, the effect being especially noticeable when the space in which the operating liquid circulates is not entirely filled.

In accordance with the present invention, the difficulties heretofore encountered due to cavitation are eliminated by utilizing the pressure of the operating liquid at a zone of relatively high pressure in the transmission to supply operating liquid to the transmission at the zone where the pressure is relatively low during operation of the transmission and where cavitation ordinarily occurs. To this end I employ a jet pump, the inlet for pressure fluid of which is in communication with the space in which the operating liquid circulates at a place of relatively high pressure and the outlet of which communicates with the space in which the operating liquid circulates, at a place where the pressure of the operating liquid is relatively low. Further, in accordance with the invention, the inlet of the jet pump for suction fluid is placed in communication with an expansion vessel which provides a reservoir space for reserve operating fluid, operating fluid being withdrawn from the reservoir by the jet pump to maintain the desired pressure in the transmission and to make up for any losses due to leakage in the transmission. The reservoir also provides space to which excess operating fluid is returned when expansion of the operating fluid in the transmission, due to rise in temperature, occurs.

For an understanding of the more detailed nature of the invention and its more specific objects, together with the advantages to be derived from its use, reference may be had to the ensuing description of a preferred form of apparatus for carrying the invention into effect, as illustrated in the accompanying drawings forming a part of this specification.

In the drawings:—

Fig. 1 shows a section through a hydraulic transmission embodying the invention and Fig. 2 shows a packing device on a larger scale.

In the drawings, 1 indicates a primary shaft, which by means of a flange 2 is connected with a driving shaft, for instance a motor shaft, not shown in the drawing. The primary shaft is mounted by means of ball bearings in a casing 5, as at 3 and 4, said casing consisting of a plurality of parts and enclosing the entire transmission. A pumping device in the form of an impeller is rigidly secured to the primary shaft 1 by a tapered joint indicated at 6. Said impeller consists of a disk 7 which carries a number of blades 8. These blades propel the bowing fluid in the direction indicated by the arrow. The channel for flow of fluid between blades 8 is defined at its ends by the disc 7 and by an annular ring 9 secured to the ends of the blades 8 opposite the ends attached to the disc 7. The secondary shaft 10, which is rotatably mounted in the casing 5 by means of bearings 11 and 12, either directly or indirectly, carries a turbine rotor. This rotor comprises a disc 14 rigidly secured to shaft 10 by a tapered joint indicated at 13 and carrying a row of blades 15 which are in turn connected to a member 16. This ring 16 has the shape of a hollow body rotating with the turbine disk, said body carrying blades 17 as well as blades 18. The turbine rotor thus comprises three blade rings 15, 17 and 18, which are connected with the turbine disk 14 by the blades 15. 19 and 20 designate two blade rings, which are rigidly connected with the casing 5 and which, consequently, do not rotate. The operating fluid flows in the direction of the arrows, which latter in the upper part of Fig. 1 have been drawn in the various series of blades, in order clearly to show what represents the blades and what represents intermediate spaces free from the blades. The operating fluid is caused by the pump blades 8 to flow in a circuit, passing from the said blades through the turbine blades 17 where part of the energy is delivered. From the blades 17, the liquid is discharged into a channel to be deflected to the stationary guide blades 19. From these blades, the liquid flows to a channel deflecting the same to pass through the ring of blades 18 on the turbine rotor. From the turbine blades 18 the liquid is discharged directly to the ring of guide blades 20, in order then again to enter the ring of turbine blades 15. From the blades 15 the liquid is discharged into a channel which conducts it to the pump blades 8. The liquid thus circulates in a circuit, as indicated by the arrow 21 in the lower part of Fig. 1 of the drawings. For more effective deflection of the liquid the channel is provided near the shaft with a guide in the form of an annular flaring collar 22 which is carried by the turbine disk and which, therefore, rotates with the same. This guide, which is rigidly arranged on the turbine disk, also absorbs the axial thrust and thus balances a part of the axial pressure produced by the fluid on the turbine disk 14. Moreover, the spaces between the different rotating parts and between the latter and stationary parts may be made of different sizes, for instance at the space 23, so that suitable quantities of the circulating fluid may leak out into the spaces and, on the other hand, counteract the axial pressure on a turbine disk or pump disk, for example.

The hydraulic transmission herein described may preferably be arranged to transmit power between two shafts which rotate at different rates of speed, and where the secondary shaft rotates at a rate of speed corresponding to the momentary energy to be delivered thereby. By means of a toothed gearing 25 the power may be transmitted from the secondary shaft either directly to a driven shaft 26, or may be transmitted to the same through one or more gearings, for instance through a gearing of the type necessitated where reversed running of the driven shaft 26 is desired. By reason of the resistance caused by the driven shaft the secondary shaft will rotate at different speeds. The liquid will also flow at different rates of speed in its circuit, depending partly on the output to be delivered, and partly on the rate of speed at which the two shafts rotate. The pump thus causes a rise in pressure, giving a higher pressure in the radially outer parts of the gearing than in its radially inner parts. The energy lost in the hydraulic transmission is reflected for the major part in the form of an increase in the temperature of the liquid. The liquid must thus be cooled in a cooler shown diagrammatically in the drawings, as at 27. A pipe 29 connects the cooler 27 with the liquid space in the transmission at the radially outer part thereof, as at 28. A second pipe 30 connects cooler 27 with a liquid space at the inner part of the transmission, as at 38. By reason of the fact that the pressure in the transmission during operation thereof is higher at the space 28 than at the space 38, the liquid will flow from the space 28 to the cooler to be subjected to cooling therein. The liquid flows further from the cooler 27 through the pipe 30 to the space 38 in the radially inner part of the transmission.

In the same manner the pressure will be higher in the space 23 than in the space 31 which is in communication with the radially inner part of the transmission. Arranged between these places is a jet pump 32, through which the liquid flows in a radial direction toward the shaft, the pressure liquid inlet 33 of the jet pump being in communication, through the space 23, with the radially outer part 28 of the transmission, while the outlet 34 of the jet pump is at the same time in communication with the radially inner part 38 of the transmission. The inlet 35 of the jet pump for suction liquid communicates through a conduit 36 with an expansion vessel 37 situated on a higher level than the transmission. In operation, the jet pump will thus suck in liquid through the conduit 36 from the expansion vessel 37 to the radially inner part of the transmission. The jet pump will suck in liquid so that the channel system of the transmission will be filled up. The jet pump, however, tends by reason of the difference in pressure prevailing during operation between the space at 28 and the space 38 to suck in a further quantity of liquid from the expansion vessel 37 while increasing the total pressure in the transmission. The jet pump thus causes the pressure to be increased at all points within the transmission, in such a manner, however, that the pressure in the radially outer part will always be higher than the pressure in the radially inner part. By an increase of the pressure within the transmission quite a number of advantages are obtained: the cavitation of the liquid is reduced on account of the augmented pressure, and the pressure in the centrally situated part of the transmission about the shaft packings is increased to a pressure which is higher than the pressure surrounding the transmission. Thus no air will leak in through the packings to the transmission, but instead liquid will, if a leak occurs, leak out from the interior, which is more advantageous as a quantity of air in the transmission would materially impair the efficiency of the transmission. The efficiency will thus be increased, partly by reducing the tendency of the liquid to cause cavitation, and partly by preventing air from leaking into the system. When the system is not quite filled up it may also be refilled by adding liquid to the expansion vessel. Liquid may also flow over from the transmission when the pressure conditions cause a reduction of the quantity of liquid in the transmission.

Fig. 2 shows one of the shaft packings employed. One side of a corrugated sheet metal ring 39, forming a bellows around the shaft, is secured to the one side of a white-metal ring 40. The other side of the bellows ring 39 is soldered to a disk 41 secured to the casing 5 by means of bolts 42. The bellows ring 39 is resilient so that it can expand and be compressed axially. A spring 43 is inserted between the disk 41 and the ring 40 in order to make the latter press sufficiently against the rotating packing ring 44 arranged on the shaft. This ring 40 is detachably mounted on the shaft and may be hardened even if the shaft is made of a soft material. 45 is an oil groove. The packing described above is advantageous in many respects. It is disposed around the shaft at the smallest diameter thereof, and in the part of the transmission having the lowest fluid pressure, which is the most prominent advantage. Further, owing to the resiliency of the bellows 39 and the spring 43, small axial displacements of the shaft can be allowed.

Since the packing acts as an axial bearing with a small pressure the wear will be trifling. The bellows being made of metal, for instance bronze or some other copper alloy, it is possible to use in the transmission liquids which do not corrode the metal. This means a decided advantage since in a resilient packing of the kind hitherto used in which the resiliency was obtained by means of rubber rings or the like it is practically impossible to use any other liquid than water. In the new packing oil or kerosene may be used without difficulty.

While for purposes of illustration I have shown one specific embodiment of the invention, it will be understood that many changes and variations in the form and arrangement of the parts may be made within the scope of the invention which is to be understood as including all such variations as may fall within the terms of the appended claims when construed as broadly as the state of the prior art permits.

What I claim is:—

1. A hydraulic transmission of the type having a space in which operating fluid is circulated between a driving member and a driven member comprising a jet pump for maintaining the operating fluid under pressure, said jet pump having an inlet for pressure fluid in communication with a place in said space where the operating fluid is at relatively high pressure during operation of the transmission and having an outlet in communication with a place in said space where the operating fluid is at relatively lower pressure when the transmission is in operation.

2. A hydraulic transmission of the type having a space in which operating fluid is circulated between a driving member and a driven member comprising a jet pump for maintaining the operating fluid under pressure, said jet pump having an inlet for pressure fluid in communication with a place in said space where the operating fluids is at relatively high pressure during operation of the transmission and having an outlet in communication with a place in said space where the operating fluid is at relatively lower pressure when the transmission is in operation, and an expansion vessel for operating fluid in communication with said jet pump.

3. A hydraulic transmission of the type in which operating fluid is circulated in a closed path between a driving member and a driven member comprising a jet pump having an inlet for pressure fluid in communication with said path on the discharge side of the driving member and an outlet in communication with said path on the inlet side of said driving member.

4. A hydraulic transmission of the type in which operating fluid is circulated in a closed path between a driving member and a driven member comprising a jet pump having an inlet for pressure fluid in communication with said path on the discharge side of the driving member and an outlet in communication with said path on the inlet side of said driving member, and an expansion vessel for operating fluid in communication with said jet pump.

5. A hydraulic transmission comprising, in combination, means providing a space for circulation of operating fluid, a primary member comprising an impeller in said space, a secondary member comprising a turbine rotor in said space, said impeller operating to circulate the operating fluid in said space to drive said turbine rotor and a jet pump having an inlet for pressure fluid in communication with said space on the discharge side of said impeller and an outlet in communication with said space on the inlet side of said impeller.

6. A hydraulic transmission comprising, in combination, means providing a space for circulation of operating fluid, a primary member comprising an impeller in said space, a secondary member comprising a turbine rotor in said space, said impeller operating to circulate the operating fluid in said space to drive said turbine rotor, a jet pump having an inlet for pressure fluid in communication with said space on the discharge side of said impeller and an outlet in communication with said space on the inlet side of said impeller, and an expansion vessel in communication with said jet pump.

7. A hydraulic transmission comprising means providing a space for operating fluid, a primary member comprising an impeller in said space, a secondary member comprising a turbine rotor in said space, said rotor and said impeller being arranged for flow of fluid in a closed path from the discharge side of the impeller to the rotor and from the rotor to the inlet side of the impeller, and a jet pump having an inlet for pressure fluid communicating with said space between the discharge side of the impeller and the inlet side of the rotor and an outlet in communication with said space between the outlet side of the rotor and the inlet side of the impeller.

8. A hydraulic transmission comprising means providing a space for operating fluid, a primary member comprising an impeller in said space, a secondary member comprising a turbine rotor in said space, said rotor and said impeller being arranged for flow of fluid in a closed path from the discharge side of the impeller to the rotor and from the rotor to the inlet side of the impeller, a jet pump having an inlet for pressure fluid communicating with said space between the discharge side of the impeller and the inlet side of the rotor and an outlet in communication with said space between the outlet side of the rotor and the inlet side of the impeller, and an expansion vessel for operating fluid in communication with said jet pump.

9. A hydraulic transmission comprising means providing a space for operating fluid, a primary member comprising an impeller in said space, a secondary member comprising a turbine rotor in said space, said impeller arranged to cause flow of operating fluid radially outwardly in said space and said rotor being arranged to receive fluid discharged from said impeller, and a jet pump having an inlet for pressure fluid in communication with the radially outer portion of said space and an outlet in communication with the radially inner portion of said space.

10. A hydraulic transmission comprising means providing a space for operating fluid, a primary member comprising an impeller in said space, a secondary member comprising a turbine rotor in said space, said impeller arranged to cause flow of operating fluid radially outwardly in said space and said rotor being arranged to receive fluid discharged from said impeller, a jet pump having an inlet for pressure fluid in communication with the radially outer portion of said space and an outlet in communication with the radially inner portion of said space, and an expansion vessel for operating fluid in communication with said jet pump.

11. A hydraulic transmission of the type in which operating fluid is circulated in a closed path between a driving member and a driven member and means for supplying fluid under pressure to the inlet side of the driving member comprising a jet pump in communication with a reservoir for operating fluid and having an inlet for pressure fluid in communication with said path of flow at a place therein of relatively high pressure when the transmission is in operation.

12. A hydraulic transmission comprising a casing providing a space for operating fluid, a primary member comprising a shaft rotatably mounted in said casing and an impeller located in said space, a secondary member comprising a shaft rotatably mounted in said casing and a turbine rotor located in said space, packing means for said shafts and means for maintaining operating fluid within said casing and adjacent to said packing means under pressure comprising a jet pump having an inlet for pressure fluid in communication with said space on the discharge side of said impeller and an outlet for delivering operating fluid to the portion of said space on the inlet side of said impeller and in communication with said packing means.

13. A hydraulic transmission comprising a casing providing a space for operating fluid, a driving member comprising a shaft rotatably mounted in said casing and an impeller located in said space, a driven member comprising a shaft rotatably mounted in said casing and a turbine rotor located in said space, packing means for each of said shafts, and means for maintaining operating fluid within said casing and adjacent to said packing means under pressure, each of said packing means comprising a part providing a surface extending in generally radial direction, a packing ring and axially resilient means for maintaining said packing ring in contact with said surface whereby to permit axial play of the shaft.

14. A hydraulic transmission comprising a casing providing a space for operating fluid, a driving member comprising a shaft rotatably mounted in said casing and an impeller located in said space, a driven member comprising a shaft rotatably mounted in said casing and a turbine rotor located in said space, packing means for each of said shafts, and means for maintaining operating fluid within said casing and adjacent to said packing means under pressure, each of said packing means comprising a shaft part providing a surface extending in generally radial direction, a packing ring, an axially resilient bellows around said shaft connecting said packing ring with a part of said casing, and a spring for maintaining said packing ring in contact with said surface.

15. A hydraulic transmission comprising, in combination, means providing a space for circulation of operating fluid, a primary member comprising an impeller in said space, a secondary member comprising a turbine rotor in said space, said impeller operating to circulate the operating fluid in a closed path of flow in said space to drive said turbine rotor, said path of flow comprising a radially inner portion and a radially outer portion and said impeller being arranged to force operating fluid from the radially inner portion to the radially outer portion, and means for maintaining the operating fluid in the radially inner portion of said path under pressure comprising a jet pump having an inlet for pressure fluid in communication with said space on the discharge side of said impeller and an outlet in communication with said space on the inlet side of said impeller and means for supplying operating fluid from an external source to said jet pump, said jet pump operating automatically to force operating fluid to the radially inner portion of said path of flow in accordance with the difference in pressure existing between the pressures on the radially inner and the radially outer sides of said impeller.

ALF LYSHOLM.